Figure 1:
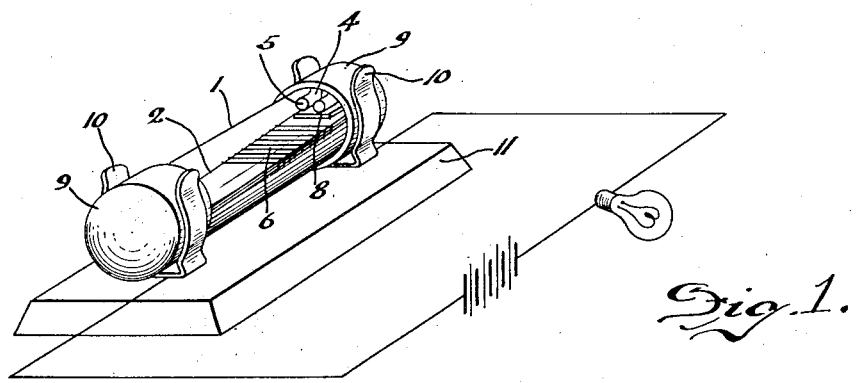

June 4, 1935.  P. A. NOTHSTINE  2,003,638
CARTRIDGE THERMOSTAT
Filed Aug. 18, 1928

Inventor
Paul A. Nothstine
By F. L. Walker
Attorney

Patented June 4, 1935

2,003,638

UNITED STATES PATENT OFFICE 2,003,638

CARTRIDGE THERMOSTAT

Paul A. Nothstine, Dayton, Ohio

Application August 18, 1928, Serial No. 300,560

11 Claims. (Cl. 200—122)

My invention relates to intermittently operated electric switches and more particularly to a thermostatic flasher for effecting automatically a periodic opening and closing of the electric circuit.

The present invention pertains to a cartridge type of flasher or thermostatic switch removably engaged in a mounting, capable of replacement in quite the same manner as the well known type of electrical fuse. The device forming the subject matter hereof embodies a bi-metal thermostatic bar associated with a heater coil enclosed within a hermetically sealed vessel or envelope which for economy of manufacture and simplicity may be formed from glass tubing. Associated with the thermal bar within the envelope or container is a magnet, the poles of which are engaged by the thermal bar as it is flexed in one direction. The magnetic attraction tends to give definition to the movements of the bi-metal bar to cause a quick closing of the contact as the bar approaches the poles of the magnet, and upon reverse tendency of the thermal bar the magnet tends to momentarily hold the bar till the tension of the bar develops sufficiently to effect a quick break. As the thermal bar makes contact with the poles of the magnet it short circuits the heater coil. As the temperature decreases the tension of the bi-metal bar increases to effect its flexing movement away from contact with the poles of the magnet, thereby again bringing the heater coil into the circuit. One of the important features of the invention is the fact that the envelope or enclosure is exhausted or filled with a neutral or inert gas. By removal of the oxygen from the vessel thus causing the contact to be made and broken in a vacuum or in a body of neutral gas, burning is obviated and the longevity of the contact points is insured.

The object of the invention is to simplify the structure as well as the means and mode of operation of automatic flashers or thermostatic switches whereby they will not only be cheapened in construction, but will be more efficient in use, positive in operation, uniform in action, automatically controlled, and unlikely to get out of repair.

A further object of the invention is to provide a hermetically sealed enclosure for a thermostatic switch or flasher device whereby the arcing of the contact points will be minimized and the life of the device materially extended.

A further object of the invention is to provide an automatic flasher or thermal switch embodying magnetic means for accelerating the make and break action.

A further object of the invention is to provide a cartridge type of flasher or thermostatic switch which may be readily replaced in or removed from a circuit without disturbing associated parts.

With the above primary and other incidental objects in view, as will more fully appear in the specification, the invention consists of the features of construction, the parts and combinations thereof, and the mode of operation, or their equivalents as hereinafter described and set forth in the claims.

Figure 2:
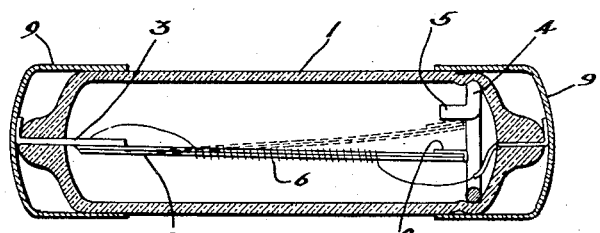
Figures 4, 5:
Figure 3:
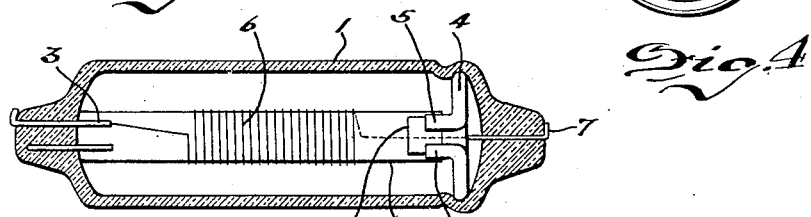

Referring to the accompanying drawing, wherein is shown the preferred, but obviously not necessarily the only form of embodiment of the invention, Fig. 1 is a perspective view of the cartridge type thermal flasher forming the subject matter hereof. Fig. 2 is a longitudinal sectional view of the assembled flasher or thermal switch. Fig. 3 is a similar view at right angles to Fig. 2. Fig. 4 is a detail perspective view of the magnet ring at the extremity of the bi-metal contact bar.

Fig. 5 is a detail sectional view of a modification of the flasher cartridge adapted for engagement in a conventional type of screw-plug fuse mounting.

Like parts are indicated by similar characters of reference throughout the several views.

Referring to the accompanying drawing, 1 is the hermetically sealed vessel or container, within which are located the operating parts of the flasher. This vessel or container, for economy of manufacture is preferably, though not necessarily, effected from glass tubing. The ends of the tubing section are heated and compressed or pitched to seal therein the electrical conductors hereafter mentioned. Located within the vessel or tube 1 is a bi-metal bar 2 of any suitable material. The metals ordinarily employed are copper or brass attached to one side of which is a strip of invar, which metal has a negligible factor of expansion and contraction under thermal changes. This bar 2 may be mounted within the vessel 1 in any suitable manner, preferably, however, by being secured to two short lengths of wire 3 which are sealed in the contracted end or "press" of the vessel or tube 1. One of these mounting wires 3 extends beyond the end of the vessel and constitutes one of the conductor terminals. Adjacent to the opposite end of the vessel or tube 1 there is enclosed therein a magnet ring 4 which surrounds the free end of the bi-metal bar 2. The ring 4 is split and has its end projected inwardly longitudinally of the vessel or tube 1, in parallel relation with the extremity of the bi-metal bar 2 when the latter is in contact engagement therewith. These ends 5 of the ring constitute the poles of the permanent magnet. Surrounding the bi-metal bar 2 or otherwise disposed in the vessel or tube 1 is a heater coil 6, one terminal of which connects with the conductor terminals 3, while the other end of the heater coil is connected with the magnet ring 4 from which extends a second conductor 7 sealed in the "press" or contracted end of the vessel or tube 1 opposite the sealed in conductor 3. A small bit 8 of iron is preferably mounted upon the free end of the terminal bar 2 to constitute an armature which is attracted and held by the poles 5 of the permanent magnet ring 4. The magnet will exert an attraction for the invar of the bi-metal thermostatic bar even though the iron armature 8 be omitted. However, the provision of the armature 8 insures the attraction and accelerates the action of the bar.

The vessel or tube 1 is provided with terminal caps 9 which enclose the contracted and sealed end of the tube and to which the conductor elements 3 and 7 are electrically connected. This affords a complete self-contained flasher switch capable of being removably mounted in spring fingers as shown at 10 in Fig. 1. These fingers 10 are mounted in pairs at spaced intervals upon a suitable insulating base 11 and are connected into an electrical circuit, which is completed by the present cartridge type of flasher. When so mounted the respective pairs of fingers 10 electrically engage the terminal caps 9 of the device, thereby completing the electric circuit through the flasher. Assuming that the cartridge has been so inserted in the mounting fingers 10 and that the thermal bar 2 being cold is flexed away from the contacts 5, the heater coil 6 will be in series with the other elements of the electrical circuit and current entering the device through one pair of contact fingers 10 and thence through the cap 9 and conductor terminals 3 will pass through such heater coil to its connection with the magnet ring 4 and thence through the conductors 7 to the opposite cap and mounting fingers 10, thus completing the circuit and generating heat within the vessel 1. As the thermal bar 2 becomes heated, it will automatically warp or flex toward the poles 5 of the magnet ring 4. As the free end of the thermal bar approaches the poles 5 of the permanent magnet and the armature bit 8 enters its magnetic field, the attraction of the magnet will effect a quick final closing movement of the bar. In this final movement the attraction of the permanent magnet is supplemental to the thermal influence of the heater coil in warping or flexing the bar 2. Upon engagement of the bar 2 with the poles 5 of the permanent magnet the shunt is completed from the conductor terminals 3 through such bi-metal bar 2 directly to the magnet ring 4, which as before mentioned, is connected through the opposite terminal 7 with the exterior cap 9. This shunt connection of the thermal bar with the magnet ring excludes temporarily the heater coil 6 and current passes through the bar 2 independently of the coil. This allows the coil to cool and at the same time permits cooling of the thermal bar 2. As the bar cools its warping or flexing tendency is in the opposite direction. It will be temporarily held, however, against breaking of engagement with the magnet ring 4 by the magnetic attraction of the latter. The breaking moment is thus delayed until the bar has acquired sufficient tension to overcome the magnetic attraction of the magnet ring 4 and when the break occurs it will be sudden, effecting an instantaneous movement to such degree as to minimize any arcing tendency. The presence of the magnet ring thus gives definition to the movement of the bi-metal blade 2 in both its closing and opening movements. The exhaustion of oxygen from the vessel or container 1 prevents any burning of the contact points. If so desired, the poles or contact ends 5 of the magnet ring may be slightly offset so that the bar will disengage one pole before leaving the other. The contact point of the latter pole and its area of engagement upon the bi-metal bar 2 may be tungsten coated to further minimize burning and insure perfect electrical contact, so long as the bar is in engagement with the poles 5 of the magnet. The operation may be effected either in vacuum or in a body of inert gas with which the vessel or tube 1 is charged.

By exhausting or gas filling and hermetically sealing the flasher chamber the oxidization of the contacts is avoided, enabling the use of tungsten contact points, thereby minimizing manufacturing costs.

From the above description it will be apparent that there is thus provided a construction of the character described, possessing the particular features of advantage before enumerated as desirable but which obviously is susceptible of modification in its form, proportions and arrangement of parts, without departing from the principle involved or sacrificing any of its advantages.

While in order to comply with the statute the invention is described in language more or less specific as to structural features, it is to be understood that the invention is not limited to the specific details shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In an automatic flasher switch, a unitary device for insertion into and removal from an electrical circuit without disturbance of the electrical connections thereof comprising a vessel, metallic terminal caps on the vessel for contact engagement with terminals of an electrical circuit, a thermostatic bar mounted within the vessel, said bar being permanently electrically connected with one of said terminal caps, a contact intermittently engaged by the bar and electrically connected with the other of said terminal caps, said bar being caused to intermittently make and break connection between said terminal caps by fluctuations of temperature.

2. In an automatic flasher switch, a unitary device for detachable engagement in a standard electrical fuse mounting, a hermetically sealed vessel from which the oxygen content has been removed, a thermostatic bar mounted therein, a contact intermittently engaged by said bar under influence of temperature fluctuations and electrical conductors leading from the bar and contact to the exterior of the vessel and terminal contacts upon the hermetically sealed vessel connected with the thermostatic bar and with the interior contact engaged thereby for contact engagement with terminals of the electrical fuse mounting.

3. In an automatic flasher switch, the combination with a conventional type fuse mounting, of a hermetically sealed vessel from which the oxygen content has been removed detachably engageable therewith, metallic terminal caps upon said vessel making contact with corresponding contacts of the mounting, and a thermostatic bar within the vessel operating under thermal fluctuations to intermittently connect and disconnect the terminal caps with each other.

4. In an automatic flasher switch, the combination with a mounting having spaced electrical contacts for connection into an electrical circuit of a vessel, a thermostatic bar within the vessel, a permanent magnet also enclosed within the vessel having its poles positioned in the path of deflection of the bar and comprising an electrical contact engaged by the bar upon deflection in one direction, and electrical conductors leading from said magnet and said bar respectively to the exterior of the vessel for detachable contact engagement with the electrical contacts of the mounting.

5. In a flasher switch, a thermostatic bar, a permanent magnet, the poles of which extend into the path of deflection of the bar, an armature carried by the bar and moved into the magnetic field by the deflection of said bar, the attraction of the magnet supplementing the thermal tension of the bar in its movement toward the magnet to effect a quick and decisive final make movement, and tending to temporarily hold the bar in opposition to its reverse thermal deflection to effect a quick and decisive break movement, a hermetically sealed enclosure for said bar and magnet, and electrical conductor leads from the bar and magnet respectively to the exterior of the enclosure.

6. In a flasher switch, a bimetallic thermostatic bar, a split magnet ring surrounding the free end of the bar with its ends extending into the path of deflection of the bar, a tubular housing within which the ring and bar are supported and electrical conductors leading from the bar and ring respectively.

7. In a flasher switch, a bimetallic thermostatic bar, a split magnet ring, the ends of which are inturned and then bent laterally in substantially parallel relation in a direction perpendicular to the plane of the ring, and a tubular mounting for the bar and ring in which the ring is supported in a position surrounding the free end of the bar, with the parallel ends of the ring in the path of deflection of the bar.

8. In a flasher switch, a hermetically sealed vessel, a thermostatic bar in said vessel, an annular magnet also within the vessel surrounding the free end of the bar with its poles in the plane of deflection of the bar, a heater coil in said vessel, said coil being bridged by said bar when in contact with the magnet poles, and electrical conductors leading to the bar and magnet.

9. In a flasher switch a hermetically sealed vessel, a body of inert gas enclosed therein, a thermostatic bar in said vessel, a magnet also within the vessel with which electrical contact is made by said bar upon deflection under influence of thermal change, and means for subjecting the bar to temperature conditions.

10. A thermostatic control device for electric circuits, comprising a thermostatic make and break switch including a bimetallic element and a magnet, a sealed receptacle in which said switch is enclosed and conductors extending from said element and said magnet to the exterior of said receptacle for connecting said switch in an electric circuit.

11. A circuit controlling device comprising a closed vessel having a non-oxidizing gaseous filling, a magnet therein, a bimetallic thermostatic element therein composed in part of magnetic material whereby it is attracted by said magnet, and lead in conductors extending through said vessel and secured to said element and magnet respectively.

PAUL A. NOTHSTINE.